US012263133B1

(12) United States Patent
Zhou

(10) Patent No.: US 12,263,133 B1
(45) Date of Patent: Apr. 1, 2025

(54) ELECTRIC YOGA WHEEL

(71) Applicant: Huaibao Zhou, Huai'an (CN)

(72) Inventor: Huaibao Zhou, Huai'an (CN)

( * ) Notice: Subject to any disclaimer, the term of this patent is extended or adjusted under 35 U.S.C. 154(b) by 0 days.

(21) Appl. No.: 18/941,700

(22) Filed: Nov. 8, 2024

(51) Int. Cl.
*A61H 15/00* (2006.01)

(52) U.S. Cl.
CPC . *A61H 15/0085* (2013.01); *A61H 2015/0014* (2013.01); *A61H 2201/0107* (2013.01); *A61H 2201/1215* (2013.01); *A61H 2201/14* (2013.01); *A61H 2201/1654* (2013.01); *A61H 2201/1695* (2013.01); *A61H 2201/5025* (2013.01)

(58) Field of Classification Search
CPC ................ A61H 15/00; A61H 15/0078; A61H 15/0085; A61H 15/0092; A61H 2015/0007; A61H 2015/0014; A61H 2015/0028; A61H 2015/0042; A61H 2201/1215; A61H 2201/0107; A61H 2201/0654; A61H 2201/0695; A61H 2201/1472
See application file for complete search history.

(56) References Cited

U.S. PATENT DOCUMENTS 2,213,482 A * 9/1940 Park .................. A61H 15/0085 601/84
2,307,554 A * 1/1943 Wettlaufer ......... A61H 23/0263 601/72
3,845,758 A * 11/1974 Anderson .......... A61H 15/0085 601/114
3,847,144 A * 11/1974 Wright ............... A61H 15/0092 601/120
4,782,823 A * 11/1988 Yamasaki .......... A61H 15/0078 601/127
5,643,181 A * 7/1997 Lin .................... A61H 15/0078 601/28
9,987,475 B2 * 6/2018 Kim .................. A61M 37/0015
2013/0310234 A1 * 11/2013 Miller, Jr. .............. A63B 22/20 482/139
2016/0310349 A1 * 10/2016 Chen ...................... A61H 15/00
2021/0128399 A1 * 5/2021 Wersland ............... A61H 15/00
2022/0015984 A1 * 1/2022 Solana ............... A61H 15/0078
2024/0299236 A1 9/2024 Gao

FOREIGN PATENT DOCUMENTS

CN 206138383 U 5/2017
CN 110393661 A * 11/2019 ......... A61H 15/0092
CN 218076151 U 12/2022
CN 219022170 U 5/2023

* cited by examiner

*Primary Examiner* — Colin W Stuart
*Assistant Examiner* — Douglas Y Sul

(57) ABSTRACT

The present invention provides an electric yoga wheel, comprising a support device, a drive device that is arranged in the support device, and a massage wheel that is rotationally connected to the support device and connected to the drive device. A flexible protective pad, which covers the massage wheel and is connected to the support device, is arranged on a circumferential side of the support device. When using the electric yoga wheel, the flexible protective pad deforms under pressure so that the flexible protective pad is pressed against the massage wheel; during massage, the flexible protective pad can avoid twining hair around the yoga wheel in such a favorable manner as to effectively eliminate the existing hidden danger during massage and make it safer for the user to massage.

18 Claims, 7 Drawing Sheets

ELECTRIC YOGA WHEEL

TECHNICAL FIELD

The present invention pertains to the technical field of massage apparatus, and specifically relates to an electric yoga wheel.

BACKGROUND

With improvement and development of living standards, the pace of life becomes faster and faster, and there are more and more "desk jockeys" and "phubbers". Due to poor postures such as long-term sitting and keeping head down, many parts of human bodies are prone to symptoms such as fatigue and pain. To relieve fatigue, people often build up a good physique and improve their health through workout, and tend to use massagers for massage, which can relax muscles, soothe nerves, promote blood circulation, enhance cell metabolism, relieve fatigue, etc. In the prior art, electric yoga wheels are not provided with protective pads. When users with long hair use these electric yoga wheels to massage their bodies, massage wheels, which rotate in a single direction, are prone to entanglement of the hair during use, thereby causing physical harm to the users and posing hidden dangers during massage.

Therefore, it is necessary to provide an electric yoga wheel to address the technical problem.

SUMMARY OF THE INVENTION

The present invention provides an electric yoga wheel to addresses the problem that as the electric yoga wheels in the prior art are not provided with protective pads, if users have long hair, the massage wheels are prone to entanglement of the hair in the course of rotation, thereby posing hidden dangers.

To solve the above technical problem, the present invention has a technical solution: an electric yoga wheel, comprising a support device, a drive device that is arranged in the support device, and a massage wheel that is in rotational connection with the support device and in drive connection with the drive device, wherein a flexible protective pad, which covers the massage wheel and is connected to the support device, is arranged on a circumferential side of the support device; the support device comprises a first fixing disc and a second fixing disc that are located on both ends of the massage wheel, respectively; a hollow column that extends to an inner side of massage wheel is arranged on one side of the first fixing disc; the drive device is arranged in the hollow column.

In the present invention, protective covers that are tightly pressed against the flexible protective pad are further arranged on both the first fixing disc and the second fixing disc.

In the present invention, fixing columns for fixing the flexible protective pad are further arranged on both the first fixing disc and the second fixing disc, and the flexible protective pad is in snap-on connection with the fixing columns.

In the present invention, first grooves are respectively arranged on surfaces of the first fixing disc and the second fixing disc, and the fixing columns are respectively located in the first grooves and under the protective covers.

In the present invention, hook-and-loop fasteners that are tightly pressed upon both ends of the flexible protective pad are further arranged in the first grooves.

In the present invention, the flexible protective pad is made of leather.

In the present invention, the drive device comprises a motor body and a first rotating disc that is sleeved around the hollow column and in drive connection with the motor body, and the massage wheel is fixed to the first rotating disc.

In the present invention, a driving gear is arranged on a motor shaft of the motor body, multiple sets of driven gears that engage with the driving gear are arranged on a circumferential side of the driving gear, a gear ring is arranged on an inner wall of the first rotating disc, and said multiple sets of driven gears engage with the gear ring;

four mounting columns and a fixing plate are arranged on one side of the motor body, there are four driven gears, said four driven gears are respectively in rotational connection with the mounting columns, and the fixing plate is connected to the mounting columns and used to limit the driven gears;

movable holes corresponding to the driven gears are opened on the hollow column, and the driven gears partially protrude through the movable holes to engage with the gear ring.

In the present invention, the drive device further comprises: a gearbox, which comprises an output shaft that is connected to the driving gear; a drive plate, on which multiple fixing columns are arranged, wherein transmission gears are arranged on the fixing columns; and a drive gear that simultaneously engage with the transmission gears, wherein the drive gear is arranged on the motor shaft.

In the present invention, a first annular groove that accommodates the massage wheel is further arranged on one side of the first rotating disc, which side is proximal to the massage wheel, and the massage wheel has one end that is located in the first annular groove.

In the present invention, a first step and a first bearing that is located on the first step are further arranged on one side of the first fixing disc, which side is proximal to the first rotating disc;

a second annular groove is further arranged on one side of the first rotating disc, which side is proximal to the first bearing, and the first bearing is located in the second annular groove.

In the present invention, a first connecting column and a first handle that is connected to the first connecting column are further arranged on one side of the first fixing disc.

In the present invention, a control button is further arranged on the first connecting column, a control plate is located in the first connecting column, and the control plate is electrically connected to the control button and the drive device, respectively.

In the present invention, a storage battery in electrical connection with the control plate is further arranged in the hollow column.

In the present invention, a charging port is further arranged on one side of the first handle, and the charging port is electrically connected to the control plate.

In the present invention, a second rotating disc that can rotate on the second fixing disc and serves to connect to the other side of the massage wheel is further arranged on the second fixing disc, and a third annular groove that accommodates the massage wheel is arranged on the second rotating disc.

In the present invention, a second step and a second bearing that is located the second step are further arranged on one side of the second fixing disc, which side is proximal to the second rotating disc;

a fourth annular groove is further arranged on one side of the second rotating disc, which side is proximal to the second bearing, and the second bearing is located in the fourth annular groove.

In the present invention, a second connecting column and a second handle that is connected to the second connecting column are further arranged on the second fixing disc.

In the present invention, a flat position shaft is further arranged in the second fixing disc, the flat position shaft has one end that is fixed in the second connecting column and the other end that passes through the second fixing disc and the second rotating disc and is fixed in the hollow column.

In the present invention, multiple heat dissipation holes are arranged on a circumferential side of the hollow column.

In the present invention, the massage wheel comprises a rotating wheel, multiple connecting strips that are detachably connected to the rotating wheel, and multiple massage protrusions that are arranged in a uniform manner and in a lengthwise direction of the connecting strips;

multiple fixing grooves in a concave shape are arranged on the rotating wheel, and the connecting strips have a convex shape and fit in with the fixing grooves.

Compared with the prior art, the present invention has the following beneficial effects: as the electric yoga wheel in the present invention drives the massage wheel to rotate through the drive device, a user lies on the flexible protective pad or presses the flexible protective pad against parts that need massaging when using the electric yoga wheel, and the flexible protective pad deforms under pressure, so that the flexible protective pad is pressed against the massage wheel; during massage, the flexible protective pad can avoid twining hair around the yoga wheel in such a favorable manner as to effectively eliminate the existing hidden danger during massage and make it safer for the user to massage.

BRIEF DESCRIPTION OF THE DRAWINGS

To make the embodiments of the present invention or the technical solutions in the prior art clearer, the drawings that need using in the embodiments are briefly introduce as follows. The drawings as described below are only figures of some of embodiments in the present invention.

Figure 1:
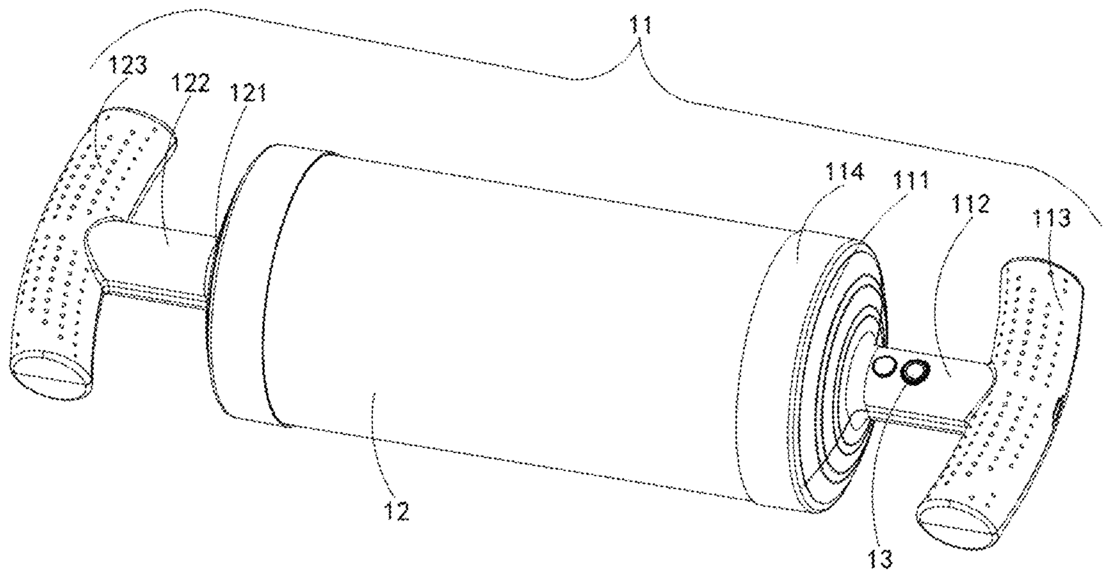
FIG. 1 is a three-dimensional diagram of the electric yoga wheel in the present invention.

11, support device; 12, flexible protective pad; 13, control button; 14, drive device; 15, massage wheel; 111, first fixing disc; 112, first connecting column; 113, first handle; 114, protective cover; 115, hollow column; 1151, heat dissipation hole; 116, first bearing; 117, control plate; 118, first groove; 119, fixing column; 120, movable hole; 121, second fixing disc; 122, second connecting column; 123, second handle; 125, second rotating disc; 126, second bearing; 127, flat position shaft; 141, motor body; 142, first rotating disc; 143, storage battery; 144, gearbox; 1421, first annular groove; 1422, gear ring; 1411, mounting column; 1412, driving gear; 1413, driven gear; 1414, fixing plate; 1416, motor shaft; 1441, drive plate; 1442, output shaft; 1443, drive gear; 1444, transmission gear; 151, rotating wheel; 152: connecting strip; 153: massage protrusion; 1511, fixing groove.

To make the objectives, technical solutions, and advantages of the embodiments in the present disclosure clearer, the technical solutions of the embodiments in the present disclosure will be described below in a clear and complete manner in combination with the drawings of the embodiment in the present disclosure. Apparently, the described embodiments are some of embodiments of the present disclosure, rather than all of them. Based on the described embodiments of the present disclosure, any other embodiments obtained by those skilled in the art without inventive labor fall within the scope of protection of the present disclosure.

Unless otherwise defined, technical terms or scientific terms used herein should have common meanings understood by persons having ordinary skill in the field to which the present disclosure pertains.

Terms such as "first", "second," and the like as used in the description and claims of the patent application of the present disclosure are not indicative of any order, number, or importance, but are just used to distinguish different components. Terms such as "comprise", "contain", and the like are intended to indicate that elements or objects preceding "comprise" or "contain" encompass elements or objects as well as equivalents thereof listed after "comprise" or "contain", and do not exclude other elements or objects. Terms such as "connected", "linked", and the like are not confined to physical connection or mechanical connection, and can also include electrical connection, direct or indirect. Terms such as "top", "bottom", "left", and "right" are only used to indicate relative positional relationships. When the absolute positional relationship of a described object changes, these relative positional relationships may also change accordingly.

The technical solutions of the embodiments in the present invention will be described below in a clear and complete manner in combination with the drawings of the embodiment in the present invention. Apparently, the described embodiments are some of embodiments of the present invention, rather than all of them. Based on the described embodiments of the present invention, any other embodiments obtained by those skilled in the art without inventive labor fall within the scope of protection of the present invention.

A preferred embodiment of the electric yoga wheel that can address the above technical problem as provided in the present invention is put as follows.

Figure 2:
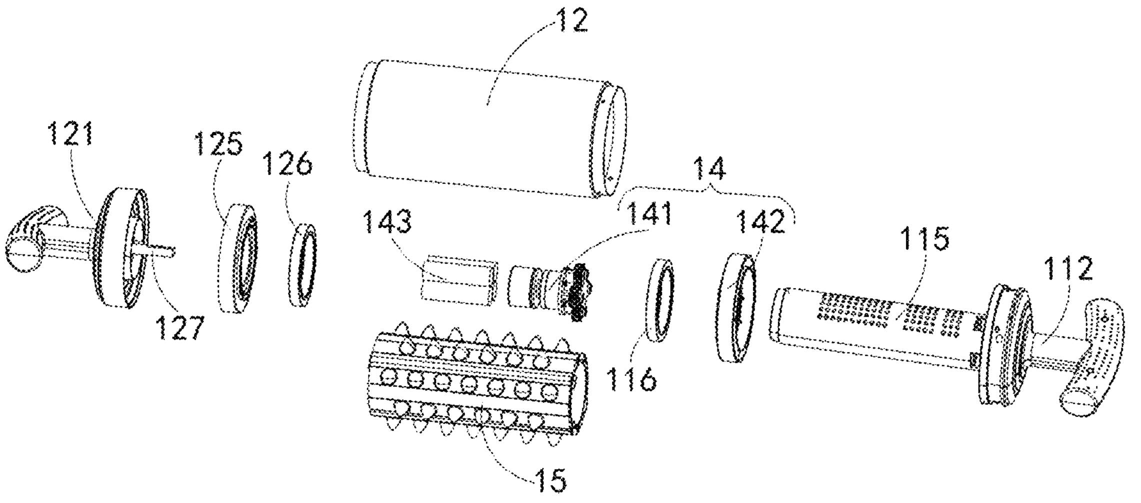
FIG. 2 is an exploded view of the electric yoga wheel in the present invention.
Figure 3:
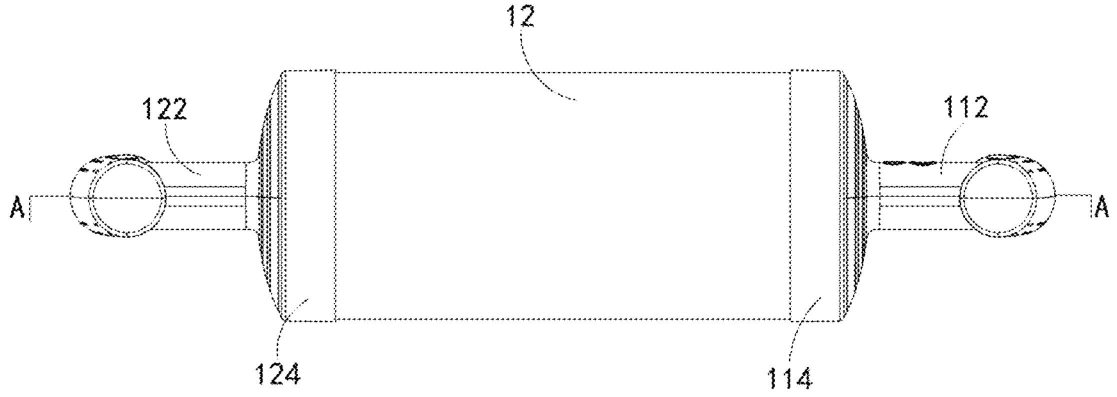
FIG. 3 is a side view of the electric yoga wheel in the present invention.
Figure 4:
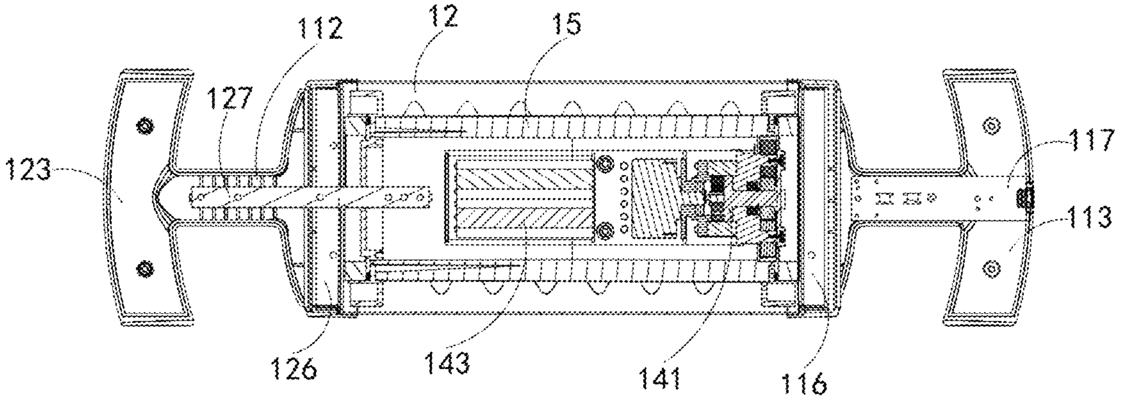
FIG. 4 is a cross-sectional view along a section line A-A in FIG. 3.

With reference to FIGS. 1, 2, 3, and 4, FIG. 1 is a three-dimensional diagram of the electric yoga wheel in the present invention, FIG. 2 is an exploded view of the electric yoga wheel in the present invention, FIG. 3 is a side view of the electric yoga wheel in the present invention, and FIG. 4 is a cross-sectional view along a section line A-A in FIG. 3.

In the figures, units with similar structures are denoted by identical reference signs.

Terms such as "first" and "second" in the present invention are only used for descriptive purposes, but they neither can be construed as indicating or implying relative importance, nor impose limitation upon sequence.

An electric yoga wheel provided in the present invention comprises a support device 11, a drive device 14 that is arranged in the support device 11, and a massage wheel 15 that is in rotational connection with the support device 11 and in drive connection with the drive device 14. A flexible protective pad 12, which covers the massage wheel 15 and is connected to the support device 11, is arranged on a circumferential side of the support device 11. The support device 11 comprises a first fixing disc 111 and a second fixing disc 121 that are located on both ends of the massage wheel 15, respectively. A hollow column 115 that extends to an inner side of the massage wheel 15 is arranged on one side of the first fixing disc 111. The drive device 14 is arranged in the hollow column 115. The support device 11 is used for mounting the massage wheel 15, the flexible protective pad 12, and the drive device 14. The massage wheel 15 is mounted on the first fixing disc 111 and the second fixed disc 121. The flexible protective pad 12 is mounted on the first fixing disc 111 and the second fixing disc 121 and located on a circumferential side of the massage wheel 15. The drive device 14 is mounted in the hollow column 115 and used to drive the massage wheel 15 to rotate. When the drive device 14 rotates the massage wheel 15 to rotate, the massage wheel 15 rotates relative to the first fixing disc 111 and the second fixing disc 121. The flexible protective pad 12 is stationary relative to the massage wheel 15. When one lies on the electric yoga wheel for massage, a part of his or her human body applies pressure upon the flexible protective pad 12, and the flexible protective pad 12 deforms and comes into intimate contact with the massage wheel. When the massage wheel 15 rotates, it is pressed against the flexible protective pad 12, so as to apply pressure upon the massaged part of the human body, achieving a massage effect. As it functions, the flexible protective pad 12 prevents direct contact between the massage wheel 15 and the massaged part of the human body, thereby effectively preventing the massage wheel 15 from contact and entanglement with hair, avoiding harms to users, and effectively eliminating the existing hidden safety risks during massage.

Protective covers 114 that are tightly pressed against the flexible protective pad 12 are further arranged on both the first fixing disc 111 and the second fixing disc 121. The protective covers 114 on the first fixing disc 111 and the second fixing disc 121 are used for tight pressure upon the flexible protective pad 12, to avoid separating the flexible protective pad 12 from the first fixing disc 111 and the second fixing disc 121, which makes it safer for users to massage.

Fixing columns 119 for fixing the flexible protective pad 12 are further arranged on both the first fixing disc 111 and the second fixing disc 121, and the flexible protective pad 12 is in snap-on connection with the fixing columns 119. The fixing columns 119 are used for snap-on connection with the flexible protective pad 12, to further avoid separating the flexible protective pad 12 from the first fixing disc 111 and the second fixing disc 121.

First grooves 118 are respectively arranged on surfaces of the first fixing disc 111 and the second fixing disc 121, and the fixing columns 119 are respectively located in the first grooves 118 and under the protective covers 114. The fixing columns 119 are located in the first grooves 118. The first grooves 118 are used to lower the height of the fixing columns 119. Moreover, the protective covers 114 hide the fixing columns 119 in the first grooves 118, thereby making the appearance of the electric yoga wheel more beautiful.

Hook-and-loop fasteners that are tightly pressed upon both ends of the flexible protective pad 12 are further arranged in the first grooves 118. The hook-and-loop fasteners are used to further limit the flexible protective pad 12 in the first grooves 118. Moreover, as the flexible protective pad 12 is fixed in the first grooves 118 through the hook-and-loop fasteners, it is convenient to disassemble and replace the flexible protective pad 12.

The flexible protective pad 12 is made of leather. Leather is breathable, smooth, fine, and comfortable when in contact with human skin. Moreover, leather has relatively high strength and possesses durability. In the present embodiment, the flexible protective pad 12 can be made of leather, but is not confined to leather alone.

Figure 8:
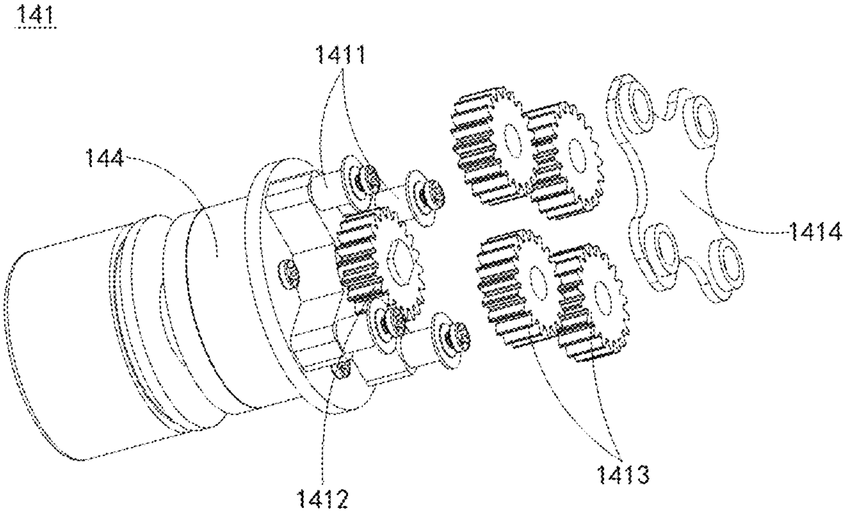
FIG. 8 is an exploded view of the drive device of the electric yoga wheel in the present invention.
Figure 9:
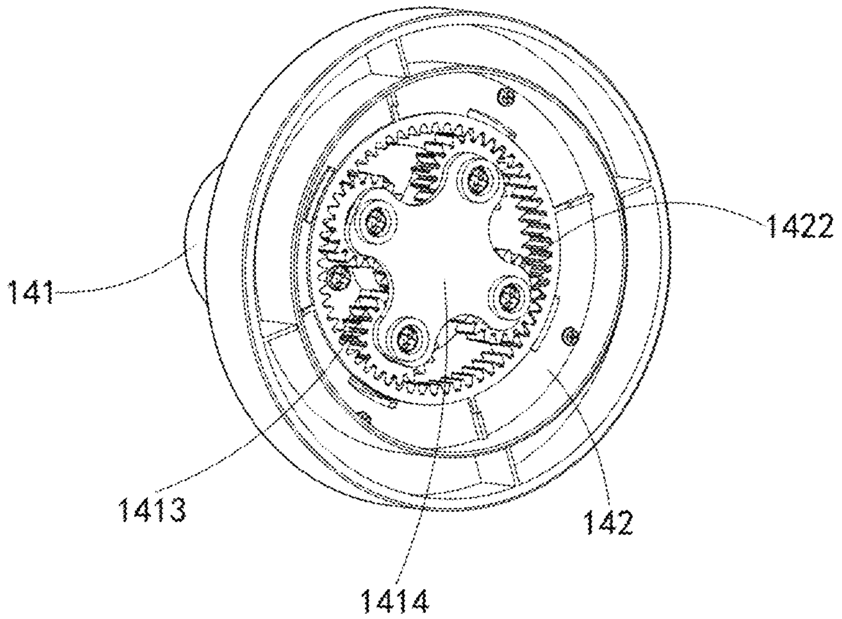
FIG. 9 is a three-dimensional diagram of the drive device of the electric yoga wheel in the present invention.
Figure 10:
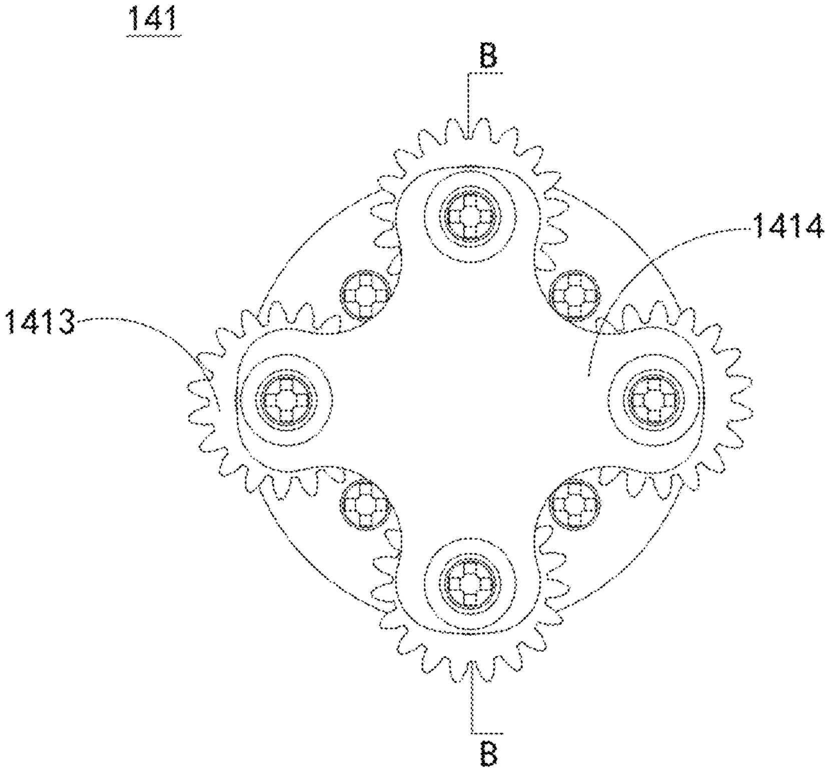
FIG. 10 is a side view of the drive device of the electric yoga wheel in the present invention.
Figure 11:
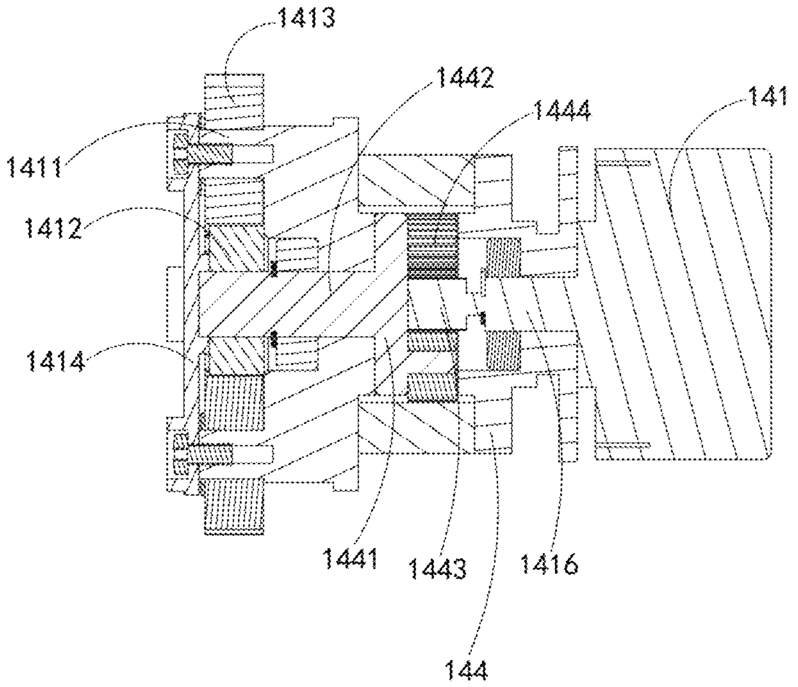
FIG. 11 a cross-sectional view along a section line B-B in FIG. 10.

With reference to FIGS. 7, 8, 9, 10, and 11, FIG. 7 a three-dimensional diagram of the first rotating disc of the electric yoga wheel in the present invention, FIG. 8 is an exploded view of the drive device of the electric yoga wheel in the present invention, FIG. 9 is a three-dimensional diagram of the drive device of the electric yoga wheel in the present invention, FIG. 10 is a side view of the drive device of the electric yoga wheel in the present invention, and FIG. 11 a cross-sectional view along a section line B-B in FIG. 10. The drive device 14 comprises a motor body 141 and a first rotating disc 142 that is sleeved around the hollow column 115 and in drive connection with the motor body 141, and the massage wheel 15 is fixed to the first rotating disc 142. The motor body 141 is located in the hollow column 115. The first rotating disc 142 is rotatably connected to the first fixing disc 111. When the motor body 141 drives the first rotating disc 142 to rotate, the first rotating disc 142 drives the massage wheel 15 to rotate, thereby leaving the massage wheel 15 in rotational connection with the first fixing disc 111 and the second fixing disc 121.

A driving gear 1412 is arranged on a motor shaft 1416 of the motor body 141, multiple sets of driven gears 1413 that engage with the driving gear 1412 are arranged on a circumferential side of the driving gear 1412, a gear ring 1422 is arranged on an inner wall of the first rotating disc 142, and said multiple sets of driven gears 1413 engage with the gear ring 1422. Four mounting columns 1411 and a fixing plate 1414 are arranged on one side of the motor body 141, there are four driven gears 1413, said four driven gears 1413 are respectively in rotational connection with the mounting columns 1414, and the fixing plate 1414 is connected to the mounting columns 1411 and used to limit the driven gears 1413. Movable holes 120 corresponding to the driven gears 1413 are opened on the hollow column 115, and the driven gears 1413 partially protrude through the movable holes 120 to engage with the gear ring 1422. The driven gears 1413 are rotatably connected to the mounting columns 1411. The fixing plate 1414 is used to connect to the mounting columns 1411 and limit the driven gears 1413, thereby AMD avoid separating the driven gears 1413 from the mounting columns 1411. The driven gears 1413 partially extend into the movable holes 120 to prevent contact between the driven gears 1413 and the hollow column 115 during the rotation of the driven gears 1413, thereby avoiding the jamming problem of the driven gears 1413. The motor body 141 drives the motor shaft 1416 to rotate, and drives the driving gear 1412 to rotate. The driving gear 1412 drives the driven gears 1413 to rotate. As the driven gears 1413 engage with the gear ring 1422 of the first rotating disc 142 and the massage wheel 15 is fixed to the first rotating disc 142, the first rotating disc 142 is driven to rotate when the driven gear ring 1422 rotates, and the first rotating disc 142 drives the massage wheel 15 to rotate.

The drive device 14 further comprises: a gearbox 144, which comprises an output shaft 1442 that is connected to the driving gear 1412; a drive plate 1441, on which multiple columns are arranged, wherein transmission gears 1444 are arranged on the columns; and a drive gear 1443 that simultaneously engage with the transmission gears 1444, wherein the drive gear 1443 is arranged on the motor shaft 1416. The gearbox 144 is used to alter the transmission ratio of the motor, and increase torque and speed, thereby increasing or decreasing the rotational speed of the columns massage wheel 15. The columns are used to mount the transmission gears 1444. The motor shaft 1416 drives the drive gear 1443 to rotate. The drive gear 1443 drives the transmission gears 1444 to rotate. The transmission gears 1444 drive the drive plate 1441 to rotate. The drive plate 1441 drives the output shaft 1442 to rotate. In this way, the output shaft 1442 drives the driving gear 1412, and the driving gear 1412 drives the driven gears 1413.

A first annular groove 1421 that accommodates the massage wheel 15 is further arranged on one side of the first rotating disc 142, which side is proximal to the massage wheel 15, and the massage wheel 15 has one end that is located in the first annular groove 1421. On one hand, the above arrangement serves to hide one end of the massage wheel 15, which makes the appearance of the massage wheel 15 as connected to the first rotating disc 142 more beautiful. On the other hand, the above arrangement serves to facilitate fixing the massage wheel 15.

In the present embodiment, the massage wheel 15 is fixed to the first rotating disc 142 through screws, but the manner is not confined to screws alone.

Figure 5:
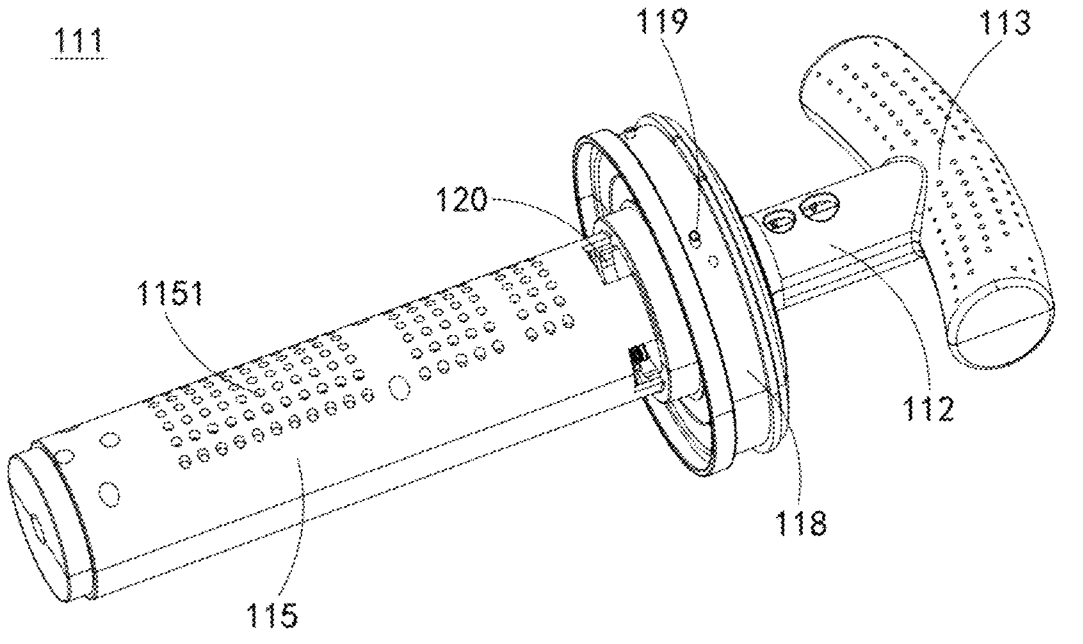
FIG. 5 is a three-dimensional diagram of the first fixing disc of the electric yoga wheel in the present invention.

With reference to FIG. 5, FIG. 5 is a three-dimensional diagram of the first fixing disc of the electric yoga wheel in the present invention. A first step and a first bearing 116 that is located on the first step are further arranged on one side of the first fixing disc 111, which side is proximal to the first rotating disc 142. A second annular groove is further arranged on one side of the first rotating disc 142, which side is proximal to the first bearing 116, and the first bearing 116 is located in the second annular groove. The first step serves to facilitate fixing the first bearing 116 to the first fixing disc 111. Moreover, the first bearing 116 is connected in the second annular groove, and the first rotating disc 142 rotates on the first bearing 116, which, on one hand, serves to avoid direct contact between the first rotating disc 142 and the first fixing disc 111 and prevent damage to the first fixing disc 111, and on the other hand, serves to smoothen the rotation of the first rotating disc 142 on the first bearing 116.

A first connecting column 112 and a first handle 113 that is connected to the first connecting column 112 are further arranged on one side of the first fixing disc 111. The first connecting column 112 serves to prolong the length of the first handle 113, thereby effectively prolonging the length of the electric yoga wheel, and making it easier for the user to operate. Additionally, the first connecting column 112 can also facilitate connection with an external bracket. As the electric yoga wheel is placed on the bracket during use, it is more convenient to use.

A control button 13 is further arranged on the first connecting column 112, a control plate 117 is located in the first connecting column 112, and the control plate 117 is electrically connected to the control button 13 and the drive device 14, respectively. The control button 13 serves to facilitate the user controlling the electric yoga wheel. Through the control button 13. The user controls the control plate 117 through the control button 13, thereby turning on or off the drive device 14. Moreover, the rotational speed of the electric device can also be controlled, so as to control the rotational speed of the massage wheel 15.

A storage battery 143 in electrical connection with the control plate 117 is further arranged in the hollow column 115. The storage battery 143 serves to store electrical power, so that the electric yoga wheel can be used during power outages. Moreover, it is also convenient to carry the electric yoga wheel for massage during outdoor activities.

A charging port is further arranged on one side of the first handle 113, and the charging port is electrically connected to the control plate 117. The charging port is used for connection with an external power source, which, on one hand, serves to charge the storage battery 143, and on the other hand, serves to supply power to the control plate 117 and the drive device 14, so that the electric massage wheel 15 can also be used when powered on.

Figure 6:
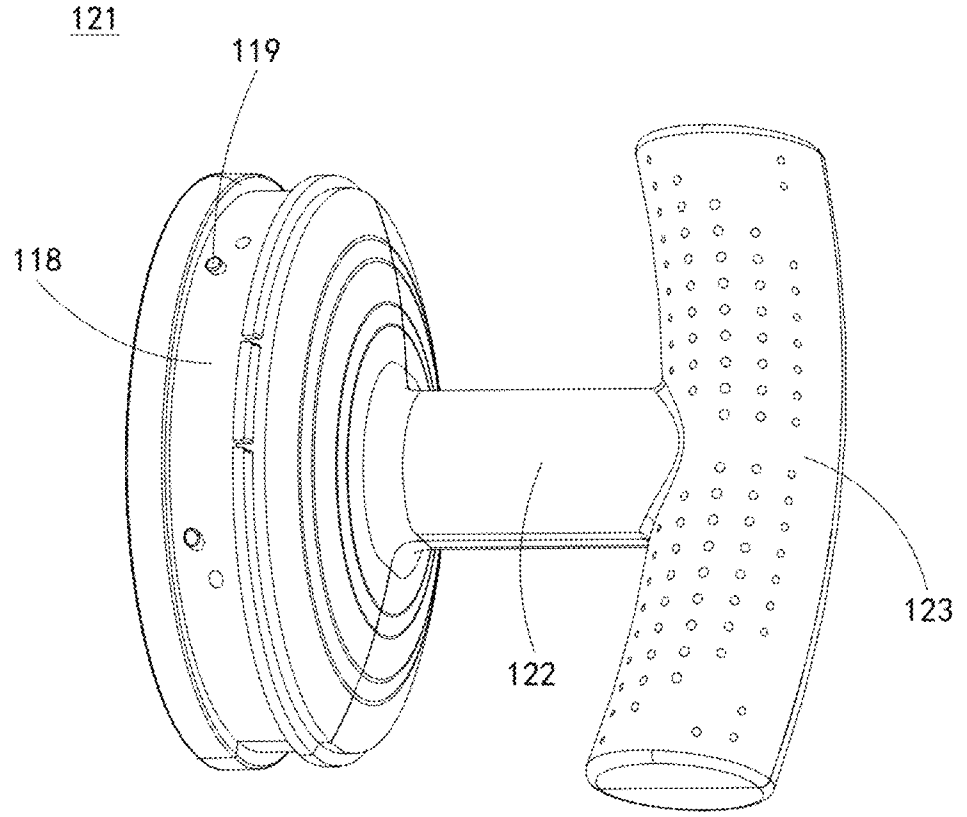
FIG. 6 is a three-dimensional diagram of the second fixing disc of the electric yoga wheel in the present invention.
Figure 7:
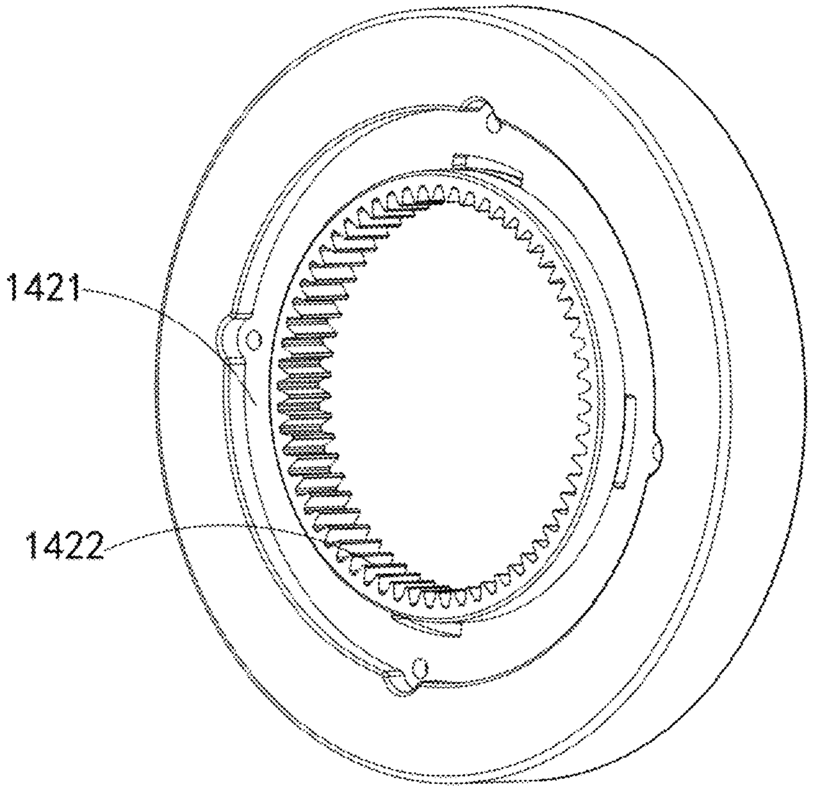
FIG. 7 a three-dimensional diagram of the first rotating disc of the electric yoga wheel in the present invention.

With reference to FIG. 6, FIG. 6 is a three-dimensional diagram of the second fixing disc of the electric yoga wheel in the present invention. A second rotating disc 125 that can rotate on the second fixing disc 121 and serves to connect to the other side of the massage wheel 15 is further arranged on the second fixing disc 121, and a third annular groove that accommodates the massage wheel 15 is arranged on the second rotating disc 125. The second rotating disc 125 is rotatably connected to the second fixing disc 121. Moreover, the other end of the massage wheel 15 is connected in the second rotating disc 125. The two ends of the massage wheel 15 are respectively connected to the first rotating disc 142 and the second rotating disc 125, which makes the rotation of the massage wheel 15 more stable.

A second step and a second bearing 126 that is located the second step are further arranged on one side of the second fixing disc 121, which side is proximal to the second rotating disc 125. A fourth annular groove is further arranged on one side of the second rotating disc 125, which side is proximal to the second bearing 126, and the second bearing 126 is located in the fourth annular groove. The second bearing 126 is sleeved and connected onto the second step of the second fixing disc 121, and the second bearing 126 is further connected to the second rotating disc 125. The second rotating disc 125 rotates on the second bearing 126, which smoothens the rotation of the second rotating disc 125.

A second connecting column 122 and a second handle 123 that is connected to the second connecting column 122 are further arranged on the second fixing disc 121. The second connecting column 122 serves to prolong the length of the second handle 123, thereby prolonging the length of the electric yoga wheel, and making it easier for the user to operate. Additionally, as the second connecting column 122 and the second connecting column 122 are simultaneously connected to an external bracket, the electric yoga wheel is hung in the air, which facilitates the user lying on his or her back against the electric yoga wheel for back massage.

A flat position shaft 127 is further arranged in the second fixing disc 121, the flat position shaft 127 has one end that is fixed in the second connecting column 122 and the other end that passes through the second fixing disc 121 and the second rotating disc 125 and is fixed in the hollow column 115. Both ends of the flat position shaft 127 are fixed in the hollow shaft and the second connecting column 122, respectively. The flat position shaft 127 fixes the hollow column

115 through the second connecting column 122, which prevents the hollow column 115 from shaking during the drive of the drive device 14.

In the present embodiment, multiple heat dissipation holes 1151 are arranged on a circumferential side of the hollow column 115. The heat dissipation holes 1151 on the circumferential side of the hollow column 115 serve to dissipate heat generated by the drive device 14, which prevents the drive device 14 in the hollow column 115 from overly high temperature.

Figure 12:
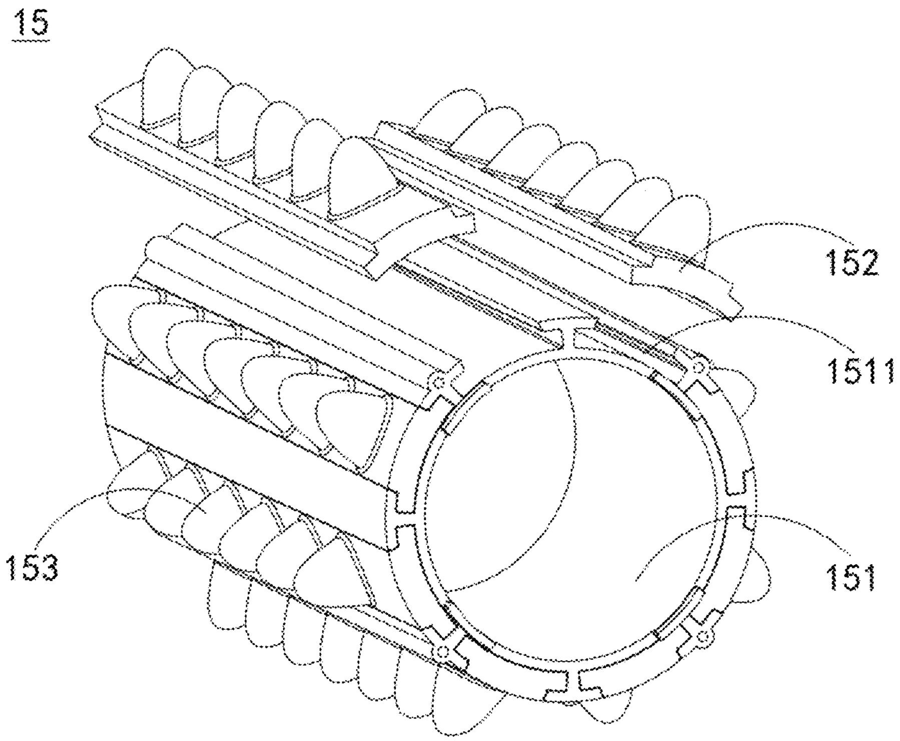
FIG. 12 is a three-dimensional diagram of the massage wheel of the electric yoga wheel in the present invention.

With reference to FIG. 12, FIG. 12 is a three-dimensional diagram of the massage wheel of the electric yoga wheel in the present invention. The massage wheel 15 comprises a rotating wheel 151, multiple connecting strips 152 that are detachably connected to the rotating wheel 151, and multiple massage protrusions 153 that are arranged in a uniform manner and in a lengthwise direction of the connecting strips 152. Multiple fixing grooves 1511 in a concave shape are arranged on the rotating wheel 151, and the connecting strips 152 have a convex shape and fit in with the fixing grooves 1511. The connecting strips 152 serve to connect in the fixing grooves 1511 in the rotating wheel 151. The massage protrusions 153 serve to massage contact parts of the human body. The connecting strips 152 are detachably connected to the rotating wheel 151, which facilitates changing the connecting strips 152 for massage protrusions 153 in different shapes.

Working Principle:

When a user performs a massage, he or she can grip the first handle 113 and the second handle 123 to apply pressure to parts that need massaging, thereby achieving a massage effect. Additionally, the first connecting column 112 and the second connecting column 122 can also be placed on an external bracket, and the user can lie on his or her back against the electric yoga wheel for massage. When the electric yoga wheel is turned on, the motor body 141 rotates and drives the drive gear 1443 to rotate. The drive gear 1443 drives the transmission gears 1444 to rotate. The transmission gear 1444 drives the drive plate 1441 to rotate. The drive plate 1441 serves to drive the output shaft 1442 to rotate. The output shaft 1442 drives the driving gear 1412 to rotate. The driving gear 1412 drives multiple sets of driven gears 1413 to rotate. Since the driven gears 1413 engage with the gear ring 1422 of the first rotating disc 142, when it rotates, the driven gears 1413 drive the first rotating disc 142 to rotate. The first rotating disc 142 rotates on the first bearing 116. Further, both ends of the rotating wheel 151 are connected to the first rotating disc 142 and the second rotating disc 125, respectively. When the first rotating disc 142 rotates, it drives the rotating wheel 151 to rotate. The rotating wheel 151 drives the second rotating disc 125 to rotate on the second bearing 126, which enables the rotating wheel 151 to rotate smoothly on the first fixing disc 111 and the second rotating disc 125. When the user has a massage, as it functions, the flexible protective pad 12 can effectively prevent direct contact between hair and the massage wheel 15, thereby effectively avoiding twining hair around the massage wheel 15, effectively eliminating the existing hidden danger during massage, and making it safer for the user to massage.

As the electric yoga wheel in the present preferred embodiment drives the massage wheel to rotate through the drive device, a user lies on the flexible protective pad or presses the flexible protective pad against parts that need massaging when using the electric yoga wheel, and the flexible protective pad deforms under pressure, so that the flexible protective pad is pressed against the massage wheel; during massage, the flexible protective pad can avoid twining hair around the yoga wheel in such a favorable manner as to effectively eliminate the existing hidden danger during massage and make it safer for the user to massage.

In conclusion, although the present invention is disclosed as above in the preferred embodiment, the above preferred embodiment is not intended to limit the present invention. Without departing from the essence and scope of the present invention, persons skilled in the art can make various kinds of modifications and refinements. Therefore, the scope of protection of the present invention is subject to the scope defined by the claims.

The invention claimed is:

1. An electric yoga wheel comprising a support device, a drive device that is arranged in the support device, and a massage wheel that is in rotational connection with the support device and in drive connection with the drive device, wherein a flexible protective pad, which covers the massage wheel and is connected to the support device, is arranged on a circumferential side of the support device; the support device comprises a first fixing disc and a second fixing disc that are located on both ends of the massage wheel, respectively; a hollow column that extends to an inner side of massage wheel is arranged on one side of the first fixing disc; the drive device is arranged in the hollow column;

wherein the drive device comprises a motor body and a first rotating disc that is sleeved around the hollow column and in drive connection with the motor body, and the massage wheel is fixed to the first rotating disc;

wherein a driving gear is arranged on a motor shaft of the motor body, four driven gears that engage with the driving gear are arranged on a circumferential side of the driving gear, a gear ring is arranged on an inner wall of the first rotating disc, and said four driven gears engage with the gear ring;

four mounting columns and a fixing plate are arranged on one side of the motor body, said four driven gears are respectively in rotational connection with the mounting columns, and the fixing plate is connected to the mounting columns and used to limit the driven gears;

movable holes corresponding to the four driven gears are opened on the hollow column, and the four driven gears partially protrude through the movable holes to engage with the gear ring.

2. The electric yoga wheel of claim 1, wherein protective covers that are tightly pressed against the flexible protective pad are further arranged on both the first fixing disc and the second fixing disc.

3. The electric yoga wheel of claim 1, wherein fixing columns for fixing the flexible protective pad are further arranged on both the first fixing disc and the second fixing disc, and the flexible protective pad is in snap-on connection with the fixing columns.

4. The electric yoga wheel of claim 3, wherein first grooves are respectively arranged on surfaces of the first fixing disc and the second fixing disc, and the fixing columns are respectively located in the first grooves and under protective covers arranged on both the first fixing disc and the second fixing disc.

5. The electric yoga wheel of claim 4, wherein hook-and-loop fasteners that are tightly pressed upon both ends of the flexible protective pad are further arranged in the first grooves.

6. The electric yoga wheel of claim 1, wherein the flexible protective pad is made of leather.

7. The electric yoga wheel of claim 1, wherein the drive device further comprises: a gearbox, which comprises an output shaft that is connected to the driving gear; a drive plate, on which multiple fixing columns are arranged, wherein transmission gears are arranged on the fixing columns; and a drive gear that simultaneously engage with the transmission gears, wherein the drive gear is arranged on the motor shaft.

8. The electric yoga wheel of claim 1, wherein a first annular groove that accommodates the massage wheel is further arranged on one side of the first rotating disc, which side is proximal to the massage wheel, and the massage wheel has one end that is located in the first annular groove.

9. The electric yoga wheel of claim 1, wherein a first step and a first bearing that is located on the first step are further arranged on one side of the first fixing disc, which side is proximal to the first rotating disc;

a second annular groove is further arranged on one side of the first rotating disc, which side is proximal to the first bearing, and the first bearing is located in the second annular groove.

10. The electric yoga wheel of claim 1, wherein a first connecting column and a first handle that is connected to the first connecting column are further arranged on one side of the first fixing disc.

11. The electric yoga wheel of claim 10, wherein a control button is further arranged on the first connecting column, a control plate is located in the first connecting column, and the control plate is electrically connected to the control button and the drive device, respectively.

12. The electric yoga wheel of claim 11, wherein a storage battery in electrical connection with the control plate is further arranged in the hollow column.

13. The electric yoga wheel of claim 11, wherein a charging port is further arranged on one side of the first handle, and the charging port is electrically connected to the control plate.

14. The electric yoga wheel of claim 1, wherein a second rotating disc that can rotate on the second fixing disc and serves to connect to the other side of the massage wheel is further arranged on the second fixing disc, and a third annular groove that accommodates the massage wheel is arranged on the second rotating disc.

15. The electric yoga wheel of claim 14, wherein a second step and a second bearing that is located the second step are further arranged on one side of the second fixing disc, which side is proximal to the second rotating disc;

a fourth annular groove is further arranged on one side of the second rotating disc, which side is proximal to the second bearing, and the second bearing is located in the fourth annular groove.

16. The electric yoga wheel of claim 14, wherein a second connecting column and a second handle that is connected to the second connecting column are further arranged on the second fixing disc.

17. The electric yoga wheel of claim 16, wherein a flat position shaft is further arranged in the second fixing disc, the flat position shaft has one end that is fixed in the second connecting column and the other end that passes through the second fixing disc and the second rotating disc and is fixed in the hollow column.

18. The electric yoga wheel of claim 1, wherein the massage wheel comprises a rotating wheel, multiple connecting strips that are detachably connected to the rotating wheel, and multiple massage protrusions that are arranged in a uniform manner and in a lengthwise direction of the connecting strips;

multiple fixing grooves in a concave shape are arranged on the rotating wheel, and the connecting strips have a convex shape and fit in with the fixing grooves.

* * * * *